(12) United States Patent
Piva

(10) Patent No.: US 11,639,825 B2
(45) Date of Patent: May 2, 2023

(54) PROCESS FOR DRYING POLYMERIC GRANULAR MATERIAL AND SYSTEM OPERATING ACCORDING TO SAID PROCESS

(71) Applicant: Pegaso Industries S.p.A., Borgoricco (IT)

(72) Inventor: Rinaldo Piva, Borgoricco (IT)

(73) Assignee: PEGASO INDUSTRIES S.P.A., Borgoricco (IT)

( * ) Notice: Subject to any disclaimer, the term of this patent is extended or adjusted under 35 U.S.C. 154(b) by 489 days.

(21) Appl. No.: 16/622,394

(22) PCT Filed: Jun. 15, 2018

(86) PCT No.: PCT/IB2018/054423
§ 371 (c)(1),
(2) Date: Dec. 13, 2019

(87) PCT Pub. No.: WO2018/229722
PCT Pub. Date: Dec. 20, 2018

(65) Prior Publication Data
US 2020/0200474 A1   Jun. 25, 2020

(30) Foreign Application Priority Data
Jun. 15, 2017   (IT) .................. 102017000066750

(51) Int. Cl.
*F26B 3/16* (2006.01)
*B29C 48/92* (2019.01)
(Continued)

(52) U.S. Cl.
CPC .............. *F26B 3/16* (2013.01); *B29B 13/065* (2013.01); *B29C 48/287* (2019.02);
(Continued)

(58) Field of Classification Search
CPC ........ F26B 3/16; F26B 17/1408; F26B 21/12; F26B 2200/08; F26B 3/06; F26B 17/1425;
(Continued)

(56) References Cited

U.S. PATENT DOCUMENTS 6,449,875 B1   9/2002   Becker et al.
2005/0091872 A1   5/2005   Gracff
(Continued)

FOREIGN PATENT DOCUMENTS

TW          397712 B  *  7/2000  .............. G01S 19/22

*Primary Examiner* — Jessica Yuen
(74) *Attorney, Agent, or Firm* — Volpe Koenig

(57) ABSTRACT

A process for drying polymeric granular material (2) comprises the steps of: —introducing into said drying hopper (10) a process gas having a predefined flow rate so as to heat and dry the polymeric granular material, —discharging a portion of the heated polymeric granular material into a transformation unit (100) for the polymeric material; —loading an amount of fresh polymeric granular material (2a) into the drying hopper. The process gas flow rate is regulated by measuring the inlet temperature of the fresh polymeric granular material (2a) and comparing it with a predefined inlet temperature of the fresh polymeric granular material, on the basis of which the predefined process gas flow rate has been calculated. If the measured inlet temperature is different from the predefined inlet temperature, the flow rate of the process gas is regulated on the basis of the measured inlet temperature.

14 Claims, 1 Drawing Sheet

(51) Int. Cl.
  *B29C 48/285*  (2019.01)
  *B29B 13/06*   (2006.01)
  *F26B 21/12*   (2006.01)
  *F26B 17/14*   (2006.01)

(52) U.S. Cl.
  CPC ............ *B29C 48/288* (2019.02); *B29C 48/92* (2019.02); *F26B 17/1408* (2013.01); *F26B 21/12* (2013.01); *B29C 2948/92019* (2019.02); *B29C 2948/92209* (2019.02); *B29C 2948/92361* (2019.02); *F26B 2200/08* (2013.01)

(58) Field of Classification Search
  CPC ........... B29B 13/065; B29B 7/72; B29B 9/16; B29B 7/60; B29B 13/02; B29C 2948/92019; B29C 2948/92209; B29C 2948/92361; B29C 48/287; B29C 48/288; B29C 48/92
  See application file for complete search history.

(56) References Cited

U.S. PATENT DOCUMENTS

2007/0277392 A1    12/2007  Zlotos et al.
2016/0084572 A1*   3/2016   Khan ..................... A61K 35/16
                                                    34/381

* cited by examiner

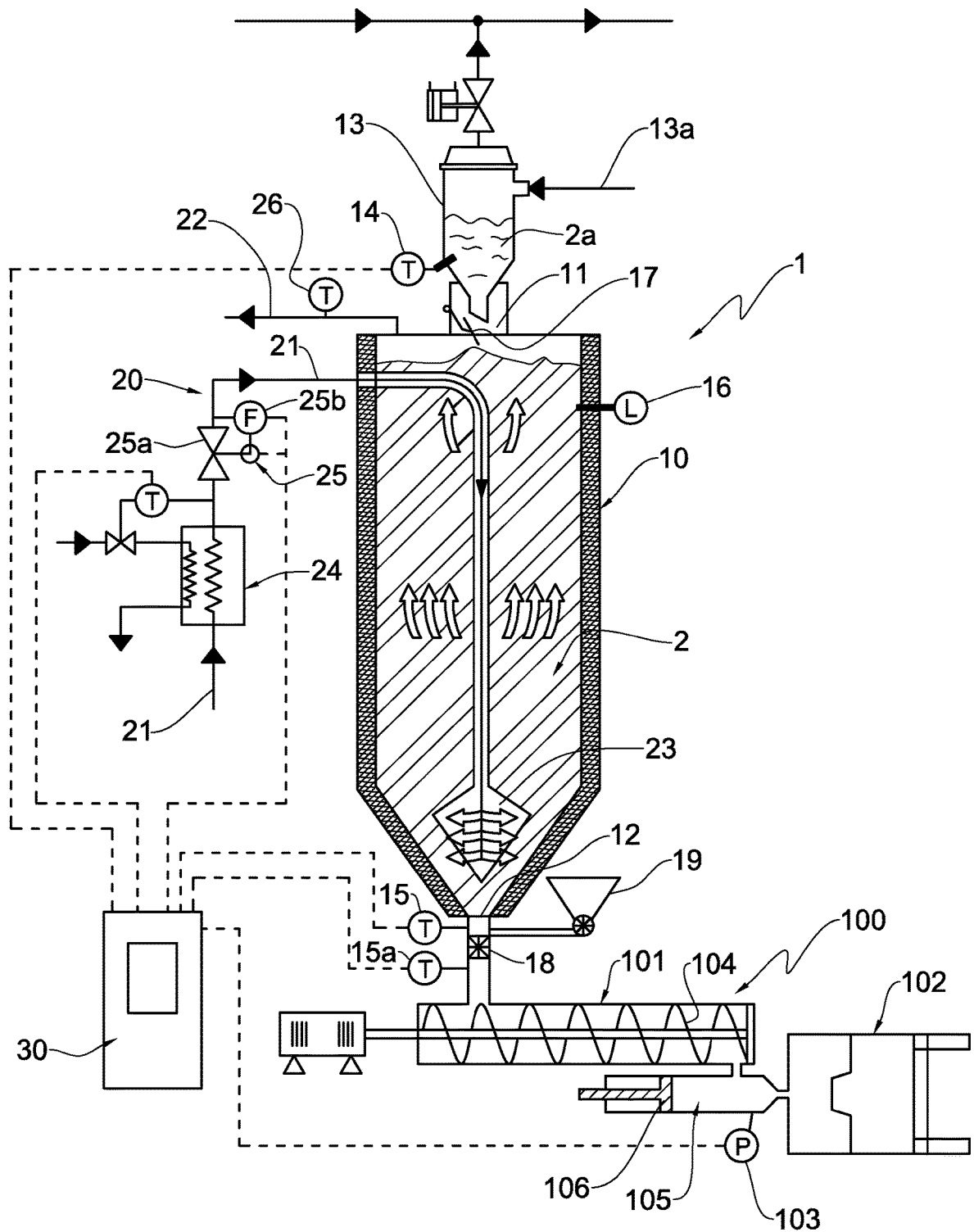

PROCESS FOR DRYING POLYMERIC GRANULAR MATERIAL AND SYSTEM OPERATING ACCORDING TO SAID PROCESS

TECHNICAL FIELD

The present invention relates to a process for drying polymeric granular material. It also relates to a drying system operating according to said process.

TECHNOLOGICAL BACKGROUND

The invention is particularly applicable to industrial processes for transforming granulated plastics materials by means of extrusion or moulding.

It is known that these operations require the plastics material introduced into the moulds to be as free of moisture as possible in order to guarantee that the moulded product has a sufficient level of quality.

However, this requirement is difficult to reconcile with the high hygroscopic properties of some plastics materials which are often used in the sector, for example those based on polyethylene terephthalate (PET), polyamide (PA), polycarbonate (PC) or some copolymers such as ABS (acrylonitrile butadiene styrene).

Therefore, before being subjected to the extrusion or moulding process, these plastics materials need to be sufficiently dried in suitable drying systems, in which the water content in the granules is reduced to the minimum amount required by the transformation process.

In one commonly used process, the polymeric granular material is dried inside a hopper, in which the material to be dried is contained and into which a continuous flow of hot dry air is introduced.

In the subsequent process for transforming the dried polymeric material, the material is brought into a molten or semi-molten state in order to be injected into a mould or extruded through a shaped head.

This step of the transformation process is carried out, for example, in an extruder in which the granular material is also brought into the molten and semi-molten state by the friction forces with which the material is pushed by a screw advancing along the extrusion chamber.

This step of the process requires a high energy input to melt the material, which is particularly onerous if the material is melted inside an extruder, so much so that in many cases the corresponding energy quota determines a large part of the overall cost for the transformation process.

As a result, there is a great need in the sector to find new solutions which allow the energy consumption to be reduced as much as possible.

There is also a particular need to keep the drying process under stable conditions, such that the dried polymeric granular material always reaches the transformation unit under the same (and optimal) temperature and moisture conditions.

It is desirable for the final temperature of the dried granular material to be as close as possible to, but not reach, the melting temperature, taking due account of the possible oxidation reactions that could lead to a polymer degradation.

The residual moisture content present in the dried granular material is generally defined by the transformation unit positioned downstream of the drying system, and is determined on the basis of the features of the transformation unit, the typology of the granular material, and the type of final product which has to be obtained from the transformation of the granular material.

The Applicant has verified that the stability of the drying process, which should guarantee the substantial constancy of the final parameters of the product leaving the hopper, can be compromised by various factors, among which the variation of the parameters of the input granular material is particularly relevant, such as the temperature, the moisture content and also the composition of the granular material to be dried.

Furthermore, the Applicant has verified that the process can become unstable as a result of other factors which are not directly correlated to the parameters of the input material, for example errors caused by the operator during the heating step at the start of the process, or during the step in which the material is discharged.

US 2005/0091872 discloses a process for drying granulated plastics material, wherein the flow rate of the process gas is regulated on the basis of the difference measured between the outlet temperature of the process gas and the inlet temperature of the granular material.

US 2007/0277392 discloses a process for drying granulated plastics material, wherein some parameters of the process gas, including the flow rate, can be regulated on the basis of parameters of the granular material which are measured at the hopper exit, for example the temperature, residual moisture and density.

U.S. Pat. No. 6,449,875 discloses a process for drying granulated plastics material, wherein some parameters of the process gas, including the flow rate, can be regulated on the basis of the temperature of the granular material, which is measured at the hopper exit.

In the present description and accompanying claims, "granular material" is understood to mean a plurality of distinct solid elements which are separate from one another and have suitable sizes and shapes depending on the processing to be carried out and on the polymeric material used, including the polymeric material in powder or flake form.

Furthermore, the term "drying" is understood to mean the process by which the moisture content in the polymeric granular material is reduced to values desired for the subsequent transformation process (moulding or extrusion), by means of substantially eliminating the water present in the inner regions of the granules.

By way of reference, the maximum residual moisture value required by the transformation unit can be approximately 20 to 100 ppm (parts per million). "Injection pressure" is understood to mean the pressure at which the granular material in the molten or semi-molten state is introduced into a mould or extruded through an extrusion head, or a pressure directly correlated to this pressure, for example the pressure measured at a different point to the inlet point or the pressure of a fluid used in a hydraulic system to push the molten polymeric material into the mould or extrusion head.

DESCRIPTION OF THE INVENTION

The problem addressed by the present invention is that of providing a process for drying polymeric granular material and a drying system which are structurally and functionally designed to overcome, at least in part, one or more of the disadvantages described above with reference to the cited prior art.

This problem is solved by the present invention by means of a process and a system produced according to the following claims.

In a first aspect thereof, the invention is aimed at a process for drying polymeric granular material, comprising the step of providing a suitable amount of polymeric granular material in a drying hopper.

The process preferably provides the step of introducing into the drying hopper a process gas having a predefined flow rate and temperature so as to heat the polymeric granular material to a desired discharging temperature and to dry said polymeric granular material to a desired residual moisture value.

The process preferably provides the step of discharging a portion of polymeric granular material, once it has been heated, to the discharging temperature into a transformation unit for the polymeric material.

The process preferably provides the step of loading an amount of fresh polymeric granular material having an inlet temperature into the drying hopper.

The process preferably provides the step of measuring the inlet temperature and comparing it with a predefined inlet temperature on the basis of which the predefined process gas flow rate has been calculated.

Preferably, if the measured inlet temperature is different from the predefined inlet temperature, the process provides the step of regulating the flow rate of the process gas on the basis of the measured inlet temperature.

On account of the features of this first aspect of the invention, the drying process is advantageously controlled by acting in advance on the potential cause of instability in the process.

In fact, if the fresh granular material which is about to be loaded into the drying hopper, or which has just been loaded into said hopper, has a temperature that is lower, or significantly lower, than that for which the process gas flow rate has been calculated, the process automatically increases the process gas flow rate so as to satisfy the greater thermal power which will be necessary for bringing the amount of fresh polymeric granular material to the desired temperature and residual moisture content conditions.

Similarly, if the fresh granular material which is about to be loaded into the drying hopper, or which has just been loaded into said hopper, has a temperature that is greater or significantly greater than that for which the process gas flow rate has been calculated, the process automatically reduces the process gas flow rate so as to avoid wasting thermal power.

This makes it possible, to a large extent, to prevent possible variations in the parameters of the polymeric granular material leaving the drying hopper which are due to variations in the parameters of the fresh granular material introduced into the drying hopper.

The new value for the process gas flow rate, on the basis of which the regulating action has to be prepared, can be calculated, for example, using a suitable algorithm or following a preset table which also takes into account, besides the extent of the deviation of the inlet temperature of the polymeric granular material with respect to the predefined inlet temperature, other process parameters, such as the amount of fresh granular material introduced into the drying hopper, the stay time and the amount of granular material present in the drying hopper.

The concrete action of regulating the process gas flow rate can be carried out either by means of regulating valves or indirectly by acting on the speed of rotation of a blower which supplies the process gas to the drying hopper.

It is specified that regulating the process gas flow rate depending on the inlet temperature of the fresh polymeric granular material does not exclude said flow rate also being regulated depending on the variation of other parameters. In particular, the process gas flow rate can be regulated so as to be substantially proportional to the flow rate of the polymeric granular material discharged from the drying hopper and supplied to the transformation unit. The flow rate of the discharged granular material can be measured in various ways, for example by measuring the weight of the drying hopper using load cells, or by means of (direct or indirect) measurements of the hourly amount of material treated, which measurements are supplied directly from the transformation unit via a suitable connection.

In a second aspect thereof, the present invention is aimed at a process for drying polymeric granular material, which process comprises the steps of providing the polymeric granular material in a drying hopper and introducing into the drying hopper a process gas having a predefined flow rate and temperature so as to heat the polymeric granular material to a discharging temperature and to dry the polymeric granular material to a predefined residual moisture value.

The process preferably includes discharging a portion of the polymeric granular material that has been heated to the discharging temperature into a transformation unit for the polymeric material.

The process preferably includes measuring the discharging temperature of the polymeric granular material at predefined time intervals so as to define a progression over time of the discharging temperature, and regulating the flow rate of the process gas on the basis of this progression over time of the discharging temperature.

On account of the features of this second aspect of the present invention, the drying process is controlled retrospectively, starting from measuring a final parameter of the process.

The Applicant has in fact confirmed that, if the discharging temperature of the material tends to decrease over time, this results in the overall efficiency of the drying and transformation process being reduced. Furthermore, a decreasing progression of the discharging temperature is generally indicative of an increase in the residual moisture content in the polymeric granular material, which can subsequently lead to a decline in the quality of the final product.

Similarly, an increasing progression of the discharging temperature can be indicative of the material being excessively dried and, in certain cases, can also lead to the material degrading as a result of excessive heating. In each case, this is indicative of greater energy consumption.

Moreover, the Applicant has advantageously confirmed that controlling the process gas flow rate on the basis of measuring the discharging temperature appears to be highly sensitive and makes it possible to respond particularly quickly to any situations of process instability.

The discharging temperature is measured at the outlet of the drying hopper, in a suitable position, for example at the bottom of the hopper or on the discharge duct upstream of a discharge valve or also immediately downstream of this discharge valve.

In a third aspect thereof, the present invention is aimed at a process for drying polymeric granular material, which process comprises the steps of providing the polymeric granular material in a drying hopper and introducing into the drying hopper a process gas having a predefined flow rate and temperature so as to heat the polymeric granular material to a discharging temperature and to dry the polymeric granular material to a predefined residual moisture value.

The process preferably includes discharging a portion of the polymeric granular material heated to the discharging temperature into a transformation unit for the polymeric material, which unit comprises a heating device in which the polymeric granular material discharged from the hopper is brought into a molten or semi-molten state, and a mould or an extrusion head, into which the polymeric granular material is introduced in the molten or semi-molten state.

The process preferably includes measuring the pressure at which the material is injected into the mould or the extrusion head at predefined time intervals so as to define a progression over time of the injection pressure, and regulating the flow rate of the process gas on the basis of this progression over time of the injection pressure.

On account of the features of this third aspect of the present invention, the drying process is controlled retrospectively, starting from measuring a transformation process parameter which is nevertheless directly correlated to one of the fundamental parameters of the drying process.

The Applicant has in fact confirmed that the injection pressure is correlated to the residual moisture content in the polymeric material, observing that pressure of this kind tends to decrease as the relative humidity content increases.

Consequently, controlling the process gas flow rate on the basis of measuring the injection pressure makes it possible to reduce the possibility of having granular material which has a high content of residual moisture, even in those cases in which the progression of this parameter is independent of the progression of the discharging temperature.

The injection pressure can be measured inside an extruder in which the granular material is caused to melt by the action of the screw, or in an injection chamber in which the molten material is collected before being injected into the mould.

Alternatively, this pressure can be measured at different points, provided that the measurement that derives therefrom is directly correlated to the pressure at which the molten polymeric material is introduced into the mould or extrusion head.

The process of the invention can include any one of the aspects described above or any combination thereof.

In particular, regulating the process gas flow rate can be based on measuring the inlet temperature of the fresh polymeric granular material that is loaded or is to be loaded into the drying hopper, and/or on measuring the discharging temperature of the fresh polymeric granular material that is discharged or is to be discharged from the drying hopper, and/or on measuring the pressure at which the molten polymeric material is injected into the mould or into the extrusion head.

In a fourth aspect thereof, the present invention is aimed at a system for drying polymeric granular material, comprising at least one drying hopper, in which an entrance for the polymeric granular material and an exit for said polymeric granular material are formed, the exit being connected to a transformation unit for said polymeric granular material.

The system preferably also comprises a drying circuit via which a process gas, for heating the polymeric granular material to a discharging temperature and for drying said polymeric granular material to a predefined residual moisture value, is introduced into the drying hopper.

The system preferably also comprises a device for regulating the flow rate of the process gas and a first temperature sensor placed at the entrance of the drying hopper for measuring an inlet temperature of the granular material.

The system preferably also comprises a control unit which is connected at least to the first temperature sensor and to the device for regulating the flow rate of the process gas and is provided to control the device for regulating the process gas flow rate depending on the inlet temperature of the granular material.

In at least one of the aforementioned aspects, the present invention can comprise one or more of the preferred features which form the subject of the dependent claims.

In an embodiment thereof, the inlet temperature of the polymeric granular material is measured in a loading hopper that is positioned upstream of said drying hopper.

The loading hopper is positioned at the entrance of the drying hopper and contains the material which has to be subsequently loaded into the drying hopper.

Measuring the inlet temperature of the granular material in this hopper makes it possible to accentuate how far in advance the process gas flow rate is regulated with respect to the new granular material being introduced into the drying hopper.

The inlet temperature of the polymeric granular material can also be measured inside the drying hopper at the entrance for the fresh granular material.

In one embodiment of the invention, the discharging temperature of the dried polymeric granular material is measured at time intervals of less than 5 minutes, preferably less than 3 minutes, even more preferably at time intervals which correspond to a processing cycle of the transformation unit and are equal to approximately 10 to 20 seconds, for example.

In one embodiment of the invention, the pressure at which the molten polymeric material is injected into the mould is measured at time intervals of less than 5 minutes, preferably less than 3 minutes, even more preferably at time intervals which correspond to a processing cycle of the transformation unit and are equal to approximately 10 to 20 seconds, for example.

The pressure considered to be the injection pressure is preferably the maximum pressure measured in the injection chamber in the cycle time.

In one embodiment of the invention, the drying system comprises a second temperature sensor which is connected to the control unit and positioned at the exit of the drying hopper for measuring the discharging temperature of the granular material.

In one embodiment of the invention, the drying system comprises a metering device provided for adding a suitable amount of additives to the granular material discharged from the drying hopper before it enters the transformation unit, and also comprises a third temperature sensor connected to the control unit and positioned upstream of the transformation unit and downstream of a point for mixing the additives supplied by the metering device and the dried granular material discharged from the drying hopper. In this way, the discharging temperature of the granular material is also measured after any additives have been added.

Alternatively, controlling the process gas flow rate can be based on only measuring the discharging temperature by means of the third temperature sensor, or on assessing the temperature values measured both by the second and by the third temperature sensor.

In one embodiment of the invention, the transformation unit comprises a heating device in which the polymeric granular material discharged from the hopper is brought into a molten or semi-molten state, and a mould or an extrusion head into which the polymeric granular material is introduced in the molten or semi-molten state, and a gauge for measuring the pressure at which the molten polymeric material is injected into the mould or extrusion head, which gauge is connected to the control unit.

The heating device preferably comprises:
an extruder in which the polymeric material is melted,
an injection chamber positioned downstream of the extruder in which the molten polymeric material is collected, and
a piston associated with the injection chamber for introducing the molten polymeric material into a mould.

BRIEF DESCRIPTION OF THE DRAWINGS

The features and advantages of the invention will become clearer from the detailed description of a preferred embodiment thereof, shown by way of nonrestrictive example and with reference to the single accompanying drawing, in which FIG. 1 is a schematic view of a system for drying polymeric granular material, which system is produced in order to operate according to the process of the present invention.

PREFERRED EMBODIMENTS OF THE INVENTION

With reference to FIG. 1, the reference numeral 1 indicates, as a whole, a system for drying a polymeric granular material 2, which system operates according to the process of the present invention.

The system 1 is designed to dry any granulated polymeric material, for example polyamide, polycarbonate or ABS copolymer, even if, in the specific example described herein, the treated material is formed of PET (polyethylene terephthalate) granules.

PET has a melting temperature of approximately 260° C., and the maximum temperature at which the polymer can be maintained in air without incurring considerable oxidation is approximately 180° C.

The system 1 is designed to supply the polymeric granular material to a transformation unit 100 which, in the specific example, comprises an extruder 101, in which the dried granular material is brought into the molten state inside a heating chamber in which the material is made to advance by means of at least one screw 104, an injection chamber 105 positioned downstream of the extruder 101, in which chamber the molten polymeric material discharged from the extruder 101 is collected, and a mould 102 into which the molten polymeric material is introduced from the injection chamber 105 by means of the action of a piston 106.

A pressure gauge 103 is mounted in the injection chamber 105, which gauge is designed to measure the pressure inside the injection chamber and, in particular, the pressure at which the molten polymeric material is introduced into the mould 102.

In the present embodiment, the transformation unit comprises a mould, or similarly it can preferably comprise an extrusion head.

The system 1 comprises a drying hopper 10, in which an inlet opening 11, through which the granular material 2 to be dried is introduced into the drying hopper 10, and an outlet opening 12, through which the dried granular material 2 is discharged from the drying hopper 10, are made.

The inlet opening 11 and outlet opening 12 are made in the top and bottom, respectively, of the drying hopper 10.

The system 1 also comprises a loading hopper 13, which is mounted immediately upstream of the drying hopper 10 at the inlet opening 11 and in which, by means of a load line 13a, an amount of fresh polymeric granular material 2a is prepared ready to be introduced into the drying hopper 10.

A first temperature sensor 14 is provided on the bottom of the loading hopper 13, which sensor measures the inlet temperature of the fresh granular material 2a. The fresh granular material 2a is generally the same as the granular material 2 that is already present in the drying hopper 10, but has a different temperature and moisture level and can differ from this material in the typology of PET used, for example it can have a different percentage of recycled material.

A supply valve 17 is provided between the loading hopper 13 and the drying hopper 10 to allow, when necessary, the fresh granular material to enter the drying hopper 10.

At the bottom of the drying hopper 10, at the outlet opening 12, a second temperature sensor 15 is also provided, which is designed to measure a discharging temperature of the granular material 2 that is ready to be discharged from the drying hopper 10.

The second temperature sensor 15 can be mounted in the discharging duct that connects the drying hopper 10 to the extruder 101, upstream of a discharge valve 18 which allows the dried granular material to be discharged towards the transformation unit 100.

The system 1 also comprises a metering device 19, which is connected immediately downstream of the outlet 12, on the discharging duct of the drying hopper 10, which device defines a point for mixing the additives and the granular material 2 exiting the drying hopper. This mixing point is preferably upstream of the discharge valve 18.

A third temperature sensor 15a is also preferably mounted in the discharging duct of the drying hopper 10, downstream of the discharge valve 18 and therefore also downstream of the aforementioned mixing point.

The system 1 also comprises a heating circuit 20, by means of which a process gas having a predefined temperature and flow rate is introduced into the drying hopper 10, in order to heat and dry the granular material 2 to desired temperature and moisture content values.

The process gas is preferably air.

The heating circuit 20 comprises a supply line 21, which brings the process gas inside the drying hopper 10, and a recovery line 22 through which the process gas is extracted from the drying hopper 10.

The supply line widens close to the bottom of the drying hopper at a diffuser 23, whereas the recovery line 22 is open close to the top of the drying hopper 10, such that the process gas flows through the hopper from the bottom towards the top, counter-currently with respect to the granular material 2.

A heater 24, which heats the process gas to a predefined heating temperature, and a device 25 for regulating the flow rate, which device regulates the flow rate of the process gas supplied to the drying hopper 10, are provided on the supply line 21.

The regulation device 25, in the embodiment described herein, operates by varying the opening of one or more regulating valves 25a, thereby confirming the correctness of the regulating action using a flow rate gauge 25b. Alternatively, the regulation device 25 could act on an inverter which regulates the speed of rotation of the blades of a blower which propels the process gas along the supply line 21.

The process gas introduced into the drying hopper 10 via the supply line 21 has a moisture value that is particularly low, which value has been obtained on account of a dehumidification treatment that is known per se and is not shown in the accompanying drawing.

The system 1 also comprises a control unit 30 for controlling and regulating the operating parameters of the system 1.

The control unit 30 is connected to the first temperature sensor 14, to the second temperature sensor 15, to the device 25 for regulating the flow rate of the process gas, to the heater 24 and to the injection pressure gauge 103. Furthermore, the control unit 30 is preferably also connected to the transformation unit 100 to receive information on the amount of granular material supplied to said transformation unit from the drying hopper 10, to a fourth temperature sensor 26 which measures the outlet temperature of the process gas from the drying hopper 10, to a level sensor 16 which measures the level of granular material 2 inside the drying hopper 10, to the third temperature sensor 15a and to the supply and discharge valves 17, 18.

In one embodiment which is not shown, the control unit 30 is also connected to load cells which detect the weight of the drying hopper 10 and the granular material 2 contained therein.

The system 1, controlled by the control unit 30, operates in the mode described in the following.

In the drying hopper 10, the polymeric granular material 2 is heated and dried by the process gas, which is dispersed in the mass of material by the diffuser 23.

The process gas, suitably dehumidified, is supplied at a predefined heating temperature, which is obtained and controlled in the heater 24, of approximately 180° C. for example, corresponding to the maximum temperature at which the PET can be maintained in air without incurring considerable oxidation.

The flow rate of the process gas introduced into the drying hopper is regulated by the regulation device 25, which operates by varying the opening of the regulating valves 25a on the basis of the flow rate value provided by the control unit 30 (set value) and the flow rate value measured by the flow rate gauge 25b (real value).

Alternatively, the flow rate of the process gas can be regulated by varying the speed of rotation of the blower by means of an inverter, and the process gas flow rate can be measured indirectly.

As described above, the value at which the flow rate of the process gas has to be set (set value) is defined by the control unit 30.

Initially, this flow rate value is a predefined value calculated, for example, on the basis of the heating temperature of the process gas (generally predefined), a predefined inlet temperature of the granular material, and the hourly flow rate of the granular material discharged from the drying hopper.

In particular, the predefined inlet temperature of the material can be equal to a predefined standard value which is typical of the system 1, or a value set manually by the operator, or also a first temperature value measured by the first temperature sensor 14.

The hourly flow rate of the granular material discharged from the drying hopper can also be a predefined value set by the operator or typical of the system 1.

On account of the action of the process gas, the granular material 2 reaches, at the outlet opening 12, a discharging temperature of approximately 180° C. and a reduced residual moisture content, for example of approximately 40 ppm.

At the request of the transformation unit 100, a part of the granular material present at the bottom of the drying hopper 10 is discharged through the discharge opening 12 and supplied to the extruder 101 where it is melted and, after having been collected in the injection chamber 105, injected into the mould 102 by means of the piston 106.

When the level of granular material inside the drying hopper 10 decreases until it has reached a certain level, a predefined amount of fresh granular material 2a is introduced into the drying hopper 10. This fresh granular material is introduced through the inlet opening 11 from the loading hopper 13.

The flow rate of the process gas can be regulated by the control unit 30, by means of the regulation device 25, on the basis of measuring, directly and indirectly, various process parameters.

In a first operating mode, the control unit regulates the flow rate of the process gas on the basis of the measurement of the inlet temperature of the fresh polymeric granular material 2a as detected by the first temperature sensor 14.

In this case, the control unit 30 detects the inlet temperature and compares it to the predefined inlet temperature value on the basis of which the predefined process gas flow rate has been calculated, and, if the deviation between the measured inlet temperature and the predefined inlet temperature exceeds a certain tolerance threshold, it acts on the regulation device 25.

For example, if the measured inlet temperature is less than the predefined inlet temperature by more than 3° C., the process gas flow rate is subsequently increased in order to anticipate the greater thermal power demand necessary to heat the freshest material introduced into the drying hopper 10.

On the contrary, if the measured inlet temperature is greater than the predefined inlet temperature by more than 3° C., the process gas flow rate is subsequently reduced in order to not overheat the granular material and to not waste energy.

In a second operating mode, the control unit 30 regulates the flow rate of the process gas on the basis of the measurement of the discharging temperature of the dried polymeric granular material 2 as detected by the second temperature sensor 15.

In this case, the control unit 30 detects the discharging temperature at regular time intervals, for example every 2 minutes or every mould 102 cycle time (that is to say every time the piston 106 introduces the molten material into the mould, typically corresponding to approximately 10 to 20 seconds), and from this determines the progression over time.

The pressure considered to be the injection pressure is preferably the maximum pressure measured in the injection chamber 105 in the cycle time. Then, if this progression reveals that the discharging temperature is not sufficiently constant, but tends to decrease or increase, the control unit 30 acts on the regulation device 25 in order to bring the discharging temperature to predefined optimal values.

In particular, if the progression over time of the discharging temperature is decreasing, the flow rate of the process gas is increased, whereas if the progression over time of the discharging temperature is increasing, the flow rate of the process gas is decreased.

The control unit preferably also measures the progression of the discharging temperature measured by the third temperature sensor 15a. This provides verification of the measurements from the second sensor 15 and also provides an indication of the thermal input of any addition of additives into the dried polymeric granular material, which have been added by the metering device 19.

In a third operating mode, the control unit 30 regulates the flow rate of the process gas on the basis of the measurement, detected by the pressure gauge 103, of the injection pressure, which corresponds to the pressure of the polymeric granular material in the molten state when introduced into the mould 102. The injection pressure preferably corresponds to the maximum pressure detected by the gauge 103 inside the injection chamber 105 during the cycle time for injection into the mould 102.

In this case, the control unit 30 detects the injection pressure at regular time intervals, for example every 2 minutes or every mould 102 cycle time (that is to say every time the piston 106 introduces the molten material into the mould, typically corresponding to approximately 10 to 20 seconds), and from this determines the progression over time.

Then, if this progression reveals that the injection pressure is not sufficiently constant, but tends to decrease or increase, the control unit 30 acts on the regulation device 25 in order to bring the injection pressure to predefined optimal values.

In particular, if the progression over time of the injection pressure is decreasing, the flow rate of the process gas is increased, whereas if the progression over time of the injection pressure is increasing, the flow rate of the process gas is decreased.

The control unit 30 can be designed to control the process gas flow rate according to any one of the operating modes described above, as well as to control the process gas flow rate according to any combination of these operating modes.

It is particularly preferred for the control unit 30 to control the process gas flow rate on the basis of all of these operating modes at the same time. In fact, it is noted that these are not mutually exclusive and that the flow rate can therefore be controlled by taking into account the inlet temperature of the polymeric material, the progression over time of the discharging temperature, and the progression over time of the injection pressure.

Furthermore, the control unit 30 can also regulate the flow rate of the process gas on the basis of the hourly amount of granular material dried in the drying hopper.

This value can be derived from measurements over time of the total weight of the hopper, which in this case is preferably supported on load cells, or can be derived indirectly by counting the moulding cycles of the transformation unit 100.

The system and the process of the present invention can be produced in variants which differ from the preferred example described above.

On account of the process and the system of the present invention, it is possible to obtain excellent results in terms of stability of the process for drying polymeric granular material, thereby optimising the energy efficiency and reliability of the process.

Another advantage is that the system is flexible in its operation and simple for the operators to control.

A further important advantage is that the process of the invention allows the performance in terms of qualitative yield to be improved and the production of processing discards to be reduced.

The invention claimed is:

1. Process for drying polymeric granular material (2), comprising:
   providing said polymeric granular material in a drying hopper (10),
   introducing into said drying hopper a process gas having a predefined flow rate and temperature so as to heat said polymeric granular material to a predefined discharging temperature and to dry said polymeric granular material to a predefined residual moisture value,
   discharging a portion of said polymeric granular material heated to said discharging temperature into a transformation unit (100) for said polymeric material;
   loading an amount of fresh polymeric granular material (2a) having an inlet temperature into said drying hopper,
   measuring said inlet temperature and comparing it with a predefined inlet temperature of said polymeric granular material, on the basis of which said predefined process gas flow rate has been calculated, and
   if said measured inlet temperature is different from said predefined inlet temperature, regulating the flow rate of said process gas on the basis of said measured inlet temperature.

2. The process according to claim 1, wherein said inlet temperature of said polymeric granular material is measured in a loading hopper (13) that is positioned upstream of said drying hopper.

3. The process according to claim 1 further comprising:
   measuring the discharging temperature of said polymeric granular material at predefined time intervals, determining a progression over time of said discharging temperature on the basis of said measurements, and regulating said flow rate of said process gas on the basis of said progression over time of said discharging temperature.

4. The process according to claim 3, wherein, if said progression over time of said discharging temperature is decreasing, the flow rate of said process gas is increased.

5. The process according to claim 3, wherein, if said progression over time of said discharging temperature is increasing, the flow rate of said process gas is decreased.

6. The process according to claim 1, wherein said transformation unit (100) comprises:
   a heating device (101) in which said polymeric granular material discharged from said hopper is brought into a molten or semi-molten state, and
   a mold (102) or an extrusion head, into which said polymeric granular material is introduced in the molten or semi-molten state,
   and the method further comprises:
   measuring the pressure at which said molten or semi-molten polymeric granular material is injected into said mold or said extrusion head at predefined time intervals, so as to stabilize a progression over time of said injection pressure, and
   regulating said flow rate of said process gas on the basis of said progression over time of said injection pressure.

7. The process according to claim 6, wherein, if said progression over time of said injection pressure is decreasing, the flow rate of said process gas is increased.

8. The process according to claim 6, wherein, if said progression over time of said injection pressure is increasing, the flow rate of said process gas is decreased.

9. The process according to claim 1, further comprising:
   measuring said discharging temperature of said polymeric granular material at predefined time intervals so as to define a progression over time of said discharging temperature, and
   regulating the flow rate of said process gas on the basis of said progression over time of said discharging temperature.

10. Process for drying polymeric granular material (2), comprising:
    providing said polymeric granular material in a drying hopper (10), introducing into said drying hopper a process gas having a predefined flow rate and temperature so as to heat said polymeric granular material to a discharging temperature and to dry said polymeric granular material to a predefined residual moisture value, discharging a portion of said polymeric granular material heated to said discharging temperature into a transformation unit (100) for said polymeric material, said transformation unit comprises a heating device (101) in which said polymeric granular material discharged from said hopper is brought into a molten or semi-molten state, and a mold (102) or an extrusion head, into which said polymeric granular material is introduced in the molten or semi-molten state;

measuring the pressure at which said molten or semi-molten polymeric granular material is injected into said mold or said extrusion head at predefined time intervals, so as to define a progression over time of said injection pressure, and regulating the flow rate of said process gas on the basis of said progression over time of said injection pressure.

11. System (1) for drying polymeric granular material (2), comprising:

at least one drying hopper (10), in which an entrance (11) for said polymeric granular material and an exit (12) for said polymeric granular material are formed, said exit being connected to a transformation unit (100) for said polymeric granular material, a heating circuit (20), via which a process gas, for heating said polymeric granular material to a discharging temperature and for drying said polymeric granular material to a predefined residual moisture value, is introduced into said drying hopper, a device (25) for regulating the flow rate of said process gas, a first temperature sensor (14) placed at said entrance for measuring an inlet temperature of said granular material, and a control unit (30) connected at least to said first temperature sensor and to said device for regulating the flow rate of said process gas and provided to control said device (25) for regulating the process gas flow rate depending on the difference between said inlet temperature, measured by said first sensor, and a predefined inlet temperature of said fresh polymeric granular material, on the basis of which a predefined process gas flow rate has been calculated.

12. The system according to claim 11, wherein a second temperature sensor (15) connected to said control unit (30) and positioned at said exit (12) is provided for measuring said discharging temperature of said granular material, and wherein said control unit is provided to control said device (25) for regulating the process gas flow rate depending on said discharging temperature.

13. The system according to claim 12, wherein a metering device (19) is provided for adding additives to said polymeric granular material discharged from said drying hopper (10) before the polymeric granular material enters said transformation unit (100), and said system comprises a third temperature sensor (15*a*) connected to said control unit (30) and positioned upstream of said transformation unit and downstream of a mixing point between said metering device and said drying hopper.

14. The system according claim 11, wherein said transformation unit comprises:

a heating device (101) in which said polymeric granular material discharged from said hopper is brought into a molten or semi-molten state, and a mold (102) or an extrusion head, into which said polymeric granular material is introduced in the molten or semi-molten state, and wherein said control unit (30) is connected to a gauge (103) for measuring the pressure at which said molten or semi-molten polymeric granular material is injected into said mold or extrusion head, and is provided for controlling said device (25) for regulating the process gas flow rate depending on said injection pressure.

\* \* \* \* \*